US011805278B2

(12) United States Patent
Matysik

(10) Patent No.: US 11,805,278 B2
(45) Date of Patent: *Oct. 31, 2023

(54) IMAGE COMPRESSION

(71) Applicant: DISPLAYLINK (UK) LIMITED, Cambridge (GB)

(72) Inventor: Sebastian Matysik, Ruda Slaska (PL)

(73) Assignee: DISPLAYLINK (UK) LIMITED

(*) Notice: Subject to any disclaimer, the term of this patent is extended or adjusted under 35 U.S.C. 154(b) by 0 days.

This patent is subject to a terminal disclaimer.

(21) Appl. No.: 18/047,423

(22) Filed: Oct. 18, 2022

(65) Prior Publication Data

US 2023/0059758 A1 Feb. 23, 2023

Related U.S. Application Data

(63) Continuation of application No. 16/956,980, filed as application No. PCT/GB2018/053645 on Dec. 17, 2018, now Pat. No. 11,509,935.

(30) Foreign Application Priority Data

Dec. 21, 2017 (GB) ...................................... 1721571

(51) Int. Cl.
*G09G 5/02* (2006.01)
*H04N 19/635* (2014.01)
(Continued)

(52) U.S. Cl.
CPC ........... *H04N 19/635* (2014.11); *G06F 3/147* (2013.01); *G06T 1/20* (2013.01); *H04N 19/186* (2014.11);
(Continued)

(58) Field of Classification Search
CPC . G09G 5/02; G09G 5/06; G09G 5/363; G06T 11/001; G06F 3/04845
(Continued)

(56) References Cited

U.S. PATENT DOCUMENTS 5,892,517 A 4/1999 Rich
2003/0108248 A1 6/2003 Huang et al.
(Continued)

FOREIGN PATENT DOCUMENTS

GB 2451911 A 2/2009
GB 2484736 A 4/2012

OTHER PUBLICATIONS

UKIPO Search Report from Great Britain Patent Application No. 1721571.6, dated Jun. 20, 2018.
(Continued)

*Primary Examiner* — Gordon G Liu
(74) *Attorney, Agent, or Firm* — Paradice & Li LLP

(57) ABSTRACT

A method of processing image data for transmittal to a display device involves receiving a frame of image data, the frame being divided into tile groups composed of tiles of pixels, each having a number of colour component values of a first colour space. Each tile includes a number of colour component planes of the first colour space having the colour component values for the pixels forming the tile. Each tile group is processed in an execution unit, formed by arithmetic logic units (ALUs) and a local shared memory, where each ALU includes dedicated register space for use solely by the ALU, and each tile of each tile group is processed by a number of the ALUs of the execution unit. Each ALU performs a reversible colour transformation (S1) on the colour component values from the first colour space to a second colour space and discards the remaining colour component values and then performs a discrete wavelet transformation (S2) on the colour component values of one colour component plane of the second colour space to produce wavelet coefficients, which are quantized (S3) and entropy encoded (S4) into variable length codes. The variable length codes for all the tiles of the tile group are assembled together for transmittal to a display device. Each
(Continued)

ALU stores the data at each stage of the processing in its dedicated register space but not in the local shared memory of the execution unit.

20 Claims, 6 Drawing Sheets

(51) Int. Cl.
    *H04N 19/186*    (2014.01)
    *H04N 19/423*    (2014.01)
    *H04N 19/91*     (2014.01)
    *G06F 3/147*     (2006.01)
    *G06T 1/20*      (2006.01)
    *H04N 19/436*    (2014.01)

(52) U.S. Cl.
    CPC .......... *H04N 19/423* (2014.11); *H04N 19/91* (2014.11); *H04N 19/436* (2014.11)

(58) Field of Classification Search
    USPC .......................................................... 345/591
    See application file for complete search history.

(56) References Cited

U.S. PATENT DOCUMENTS

| | | |
|---|---|---|
| 2003/0206661 A1 | 11/2003 | Schwartz et al. |
| 2003/0215146 A1* | 11/2003 | Schwartz ............. H04N 19/162 375/E7.199 |
| 2008/0112489 A1 | 5/2008 | Malladi et al. |
| 2009/0046937 A1* | 2/2009 | Fenney ................ H04N 19/426 382/240 |
| 2009/0225845 A1 | 9/2009 | Veremeev et al. |
| 2010/0225655 A1 | 9/2010 | Tung et al. |
| 2017/0323481 A1 | 11/2017 | Tran et al. |

OTHER PUBLICATIONS

International Search Report and Written Opinion from PCT Application No. PCT/GB2018/053645, dated Apr. 1, 2019.
Examination Report, dated Jan. 17, 2022, from Great Britain Patent Application No. GB1721571.6, 2 pages.
UKIPO Search Report, GB Application No. 1721571.6, dated Jun. 20, 2018, 5 pages.
PCT International Search Report and Written Opinion, PCT Application No. PCT/GB2018/053645, dated Apr. 1, 2019, 10 pages.

* cited by examiner

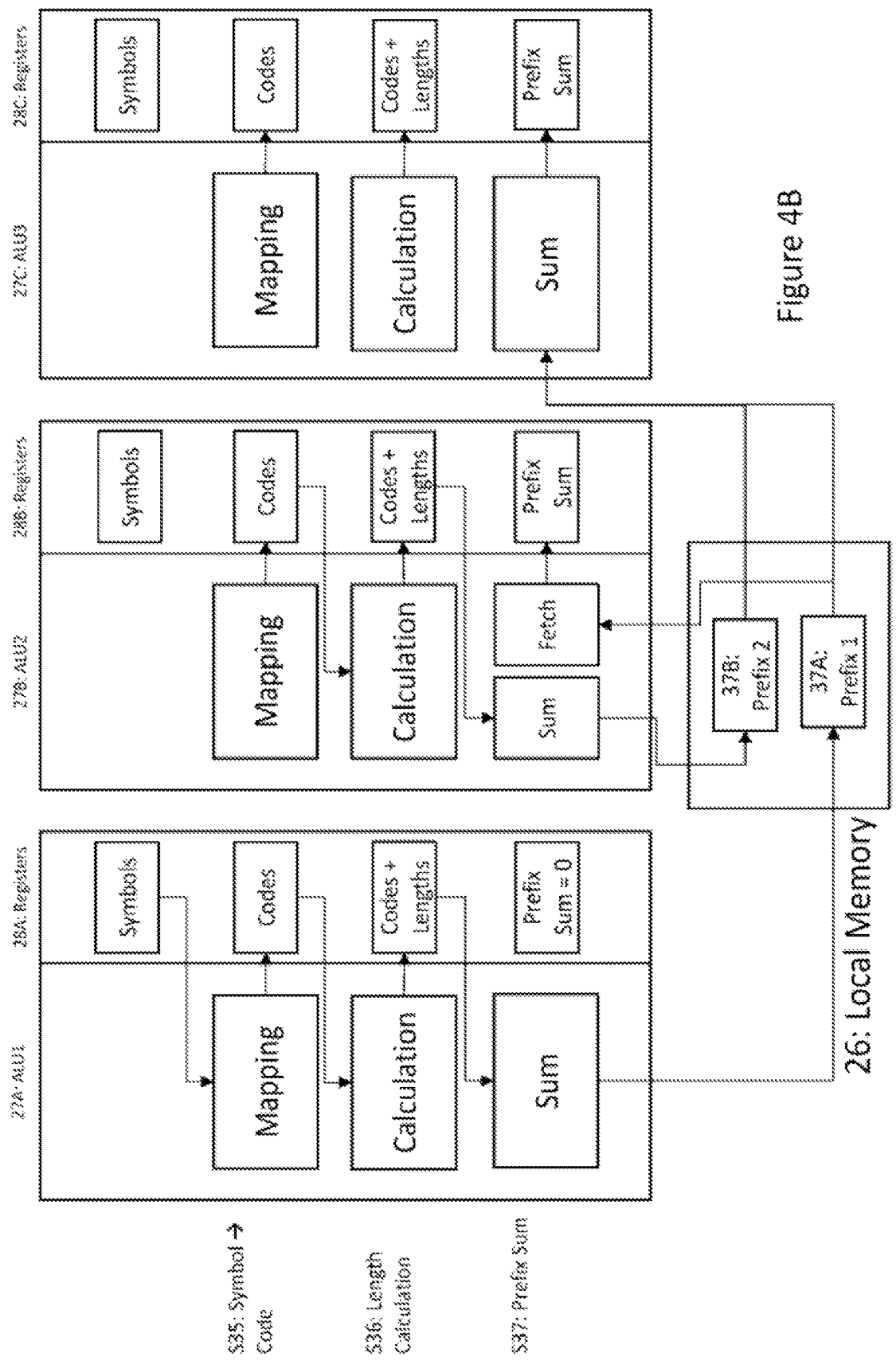

IMAGE COMPRESSION

CROSS-REFERENCE TO RELATED APPLICATIONS

This application is a continuation of U.S. patent application Ser. No. 16/956,980 filed Jun. 22, 2020, entitled "IMAGE COMPRESSION," which is a U.S. national stage application under 35 U.S.C. § 371 of International Patent Application No. PCT/GB2018/053645, filed on Dec. 17, 2018, which claims the benefit of Great Britain Patent Application No. 1721571.6 filed on Dec. 21, 2017, the contents of each of which are incorporated herein by reference in their entirety.

BACKGROUND

This invention relates to a method and device of generating and compressing an image. The image is formed of a number of tiles, which may be formed into groups of tiles, where each tile is formed of a plurality of pixels. The tiles may be rectangular, square, or any other desired shape.

The compression of video data is a large and wide-ranging technical field. In general, as display devices such as televisions and computer monitors have increased in size and resolution and the number of sources of video has increased through the expansion of television channels and Internet sites, then the importance of saving bandwidth by compressing video has correspondingly increased. Well-known technologies such as JPEG and MPEG provide compression technologies that are in extensive use throughout various different industries, particularly television broadcast and computing. These compression technologies operate on the principle that there are large temporal and spatial redundancies within video images that can be exploited to remove significant amounts of information without degrading the quality of the end user's experience of the resulting image.

For example, a colour image may have twenty-four bits of information per pixel, being eight bits each for three colour channels of red, green and blue. Using conventional compression techniques, this information can be reduced to two bits per pixel without the quality of the final image overly suffering. As shown in FIG. 1, this can be achieved by dividing the image [10] into groups [12] of rectangular blocks (or tiles), where each tile group is then subjected [S1] to a colour transform to transform the colour information (e.g. RGB values) into a different colour domain (e.g. YUV or YCbCr). Advantageously, the colour information is represented in the YUV colour space. The reason for this is that typical computer display images contain much of their information as changes in brightness (Y) and so the chroma values (UV) tend to be more easily compressible. In image compression systems for photographic data (such as JPEG, MPEG) the chroma data is subsampled, but for computer displays it is important not to do this. For instance, it would mean that coloured writing in a word processor or spreadsheet would be blurred by such a subsampling process, which is unacceptable to the user.

The colour information is then subjected [S2] to a mathematical transform (such as the Discrete Cosine Transform, or a Haar transform) to produce a series of coefficients. The Haar transform is not optimal for typical photographic data compression but is very appropriate for the compression of arbitrary screen images for a computer system, for two reasons. The first reason is that screen compression must be very fast, so that it can be applied to the entire computer screen many times per second without causing undue load on the computer's CPU. The second is that computer screens may show photographic information but may also show images such as a page of writing or graphical information. In these cases it is very important that sharp edges are preserved, even if at the expense of precise colour fidelity. The Haar transform performs well in both these cases.

These coefficients are then quantized [S3] (effectively divided by predetermined numbers) and the resulting compressed image data can be transmitted. At the receiving end, the data is decompressed by performing reverse quantization and reversing the chosen transform to reconstruct the original block. Other steps may also occur in the process, such as entropy encoding [S4], to further reduce the amount of data that is actually transmitted. Compression technologies that are based around the principle of transforming tiles and then quantizing the resulting coefficients are highly effective at reducing the amount of video data that then has to be transmitted.

When a large number of tiles are to be processed, this is often done by grouping them into tiles and then processing each tile group in an execution unit of a processing system. Each execution unit receives image data from an input buffer and outputs it to an output buffer. The input buffer may be a global memory. However, each execution also has a local shared memory which is shared by Arithmetic Logic Units (ALUs) in the execution unit, each ALU processing colour information for a tile in the group in parallel. Each ALU has one or more dedicated registers that it uses to store values during its processing. In order to perform the colour transformation from the first colour domain (e.g. RGB) to the second colour domain (e.g. YUV), a first ALU performs the colour transformation and then stores the YUV values in the local shared memory, so that each of the Y, U and V values can be accessed by a respective ALU (which may include the ALU that performed the colour transformation, but need not be), to perform subsequent processing.

As will be appreciated, there is therefore required to be a large number of writes to the local shared memory and reads from the local shared memory for each colour value of each tile in the tile group. It is therefore an object of the invention to improve upon the known art.

SUMMARY

According to a first aspect of the present invention, there is provided a method of processing image data for transmittal to a display device, the method comprising:
receiving a frame of image data, wherein the frame of image data is divided into a plurality of tile groups, each tile group composed of a plurality of tiles, wherein each tile comprises a plurality of pixels, each pixel having a plurality of colour component values of a first colour space, wherein each tile includes a plurality of colour component planes of the first colour space having the respective colour component values for the pixels forming the tile;
storing the received frame of image data in an input buffer;
processing each tile group in an execution unit, the execution unit comprising arithmetic logic units (ALUs) and a local shared memory shared by all the ALUs in the execution unit, wherein each ALU includes dedicated register space for use solely by the respective ALU, each tile of each tile group being processed by a plurality of the ALUs of the execution unit, wherein each ALU of the plurality of ALUs processing the tile:

performs a reversible colour transformation on the colour component values of the plurality of colour component planes in the first colour space of the tile to transform the colour component values in the plurality of colour component planes of the first colour space into colour component values in a plurality of colour component planes of a second colour space and stores all of the plurality of colour component values of the second colour space in the respective dedicated register space without storing the colour component values of the second colour space in the local shared memory;

processes the colour component values of one of the colour component planes of the second colour space by performing a discrete wavelet transformation on the colour component values of the one colour component plane of the second colour space from the respective dedicated register space, while discarding the remaining colour component values stored in the respective dedicated register space, to produce wavelet coefficients stored in the respective dedicated register space without storing the wavelet coefficients in the local shared memory; and quantizes the wavelet coefficients from the respective dedicated register space to produce quantized wavelet coefficients stored in the respective dedicated register space without storing the quantized wavelet coefficients in the local shared memory;

wherein the quantized wavelet coefficients for all the colour component planes of the second colour space for each tile are then entropy encoded into variable length codes and the variable length codes for all the tiles of the tile group are assembled together for transmittal to a display device.

Preferably, the first colour space is an RGB colour space, and the second colour space may be a luminance-chrominance colour space, such as a YUV colour space.

In an embodiment, the discrete wavelet transformation may comprise a Haar transform, which, in some cases, may be repeated a plurality of times during the processing to produce the wavelet coefficients.

Preferably, at least part of the entropy encoding is performed by each ALU on the quantized wavelet coefficients and the variable length codes are stored in the local shared memory.

In a preferred embodiment, the method is performed at a Graphics Processing Unit, GPU.

According to a second aspect, the invention provides a Graphics Processing Unit, GPU, configured to perform the above described method.

According to a third aspect, the invention provides a host device comprising such a GPU, a CPU and an output transport mechanism.

According to a fourth aspect, the invention provides a system for managing display data comprising such a host device and a display device coupled to the host device by a bandwidth limited transmission medium, wherein the display device comprises means configured to:

receive the variable length codes for all the tiles of the tile group via the bandwidth limited transmission medium from the host device;

decode the variable length codes for all the tiles of the tile group to form the image data; and output the image data for display.

Preferably, the display device comprises a pair of display panels for displaying the frame of image data, wherein the display device and the pair of display panels are incorporated in a wearable headset, which may comprises a virtual reality or an augmented reality headset

BRIEF DESCRIPTION OF THE DRAWINGS

Embodiments of the present invention will now be described, by way of example only, with reference to the accompanying drawings, in which:

FIGS. 4A, 4B and 4C show one embodiment of a method according to the invention of processing the display data.

DETAILED DESCRIPTION OF THE DRAWINGS

Figure 1:
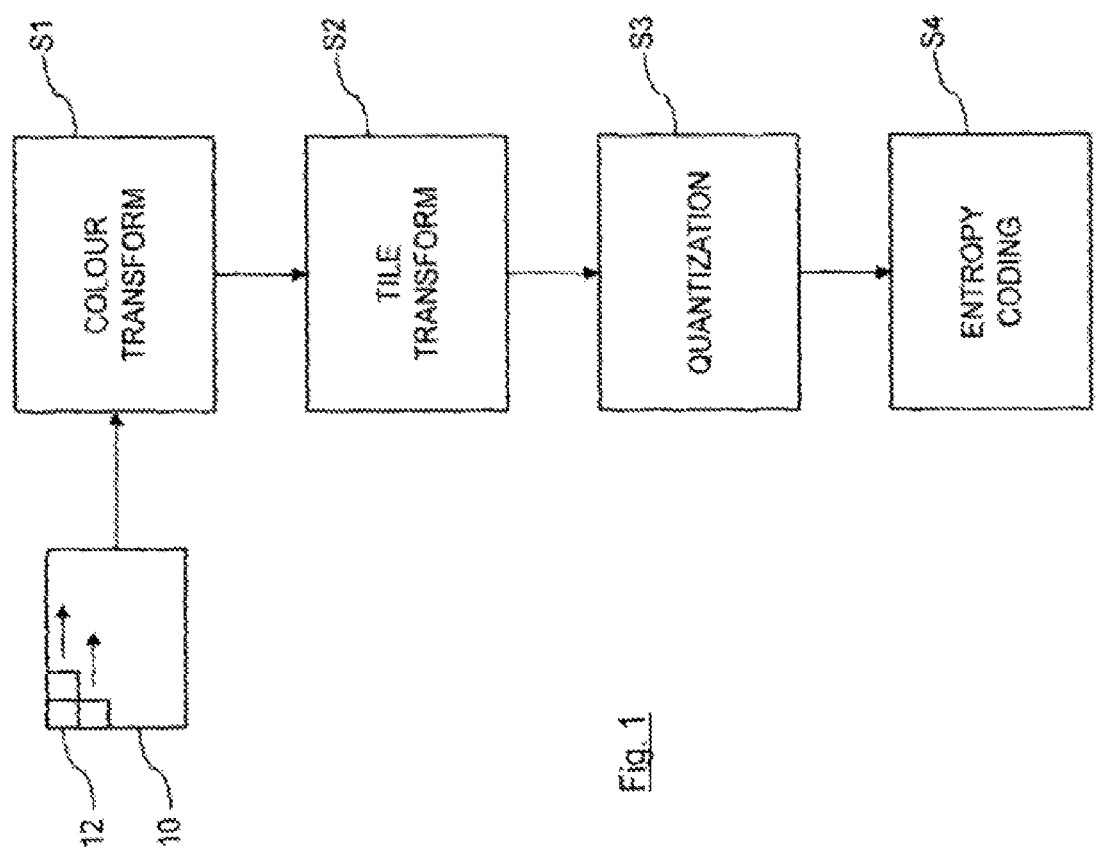
FIG. 1 shows a block diagram of a generally known process of compressing image data.
Figure 2:
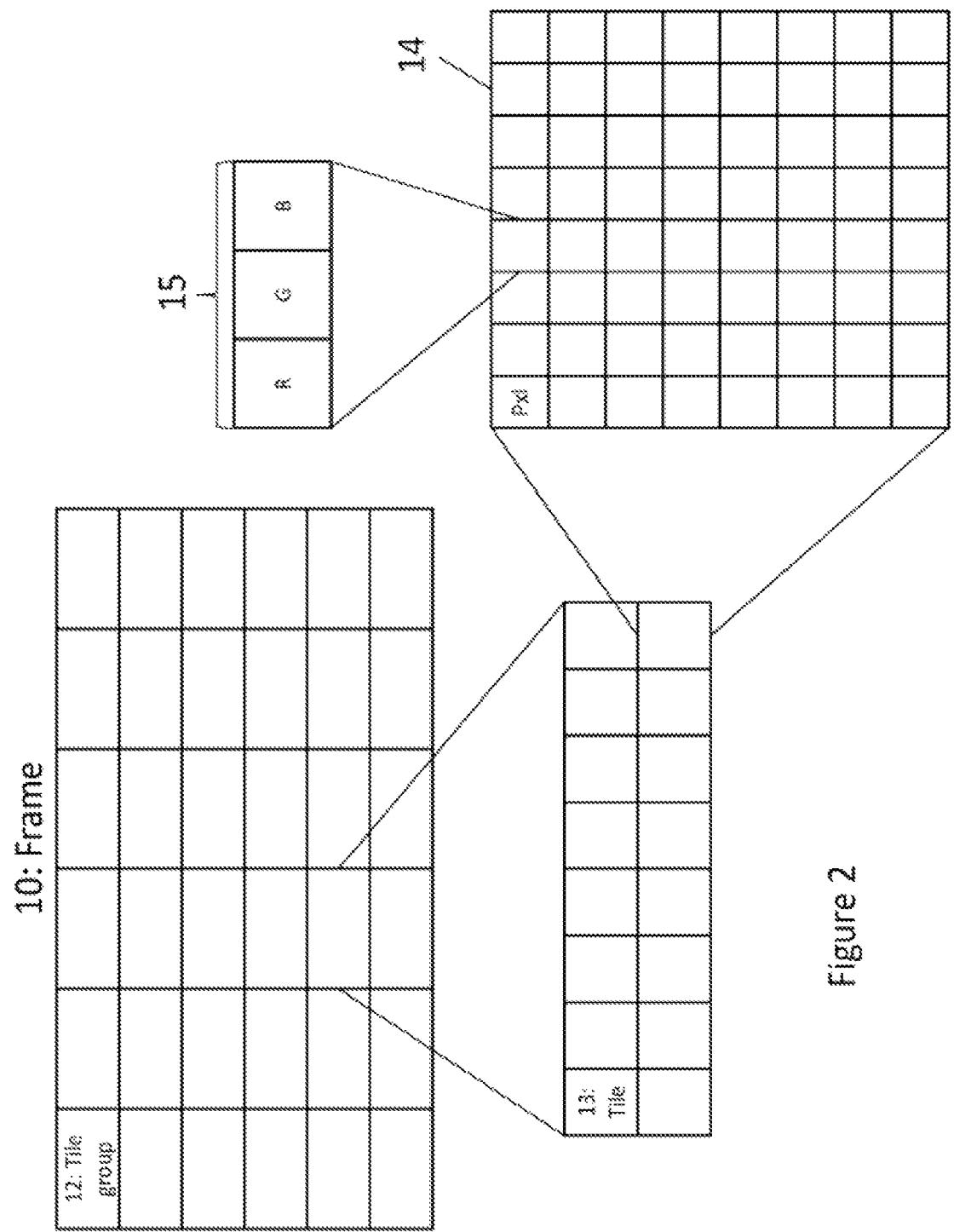
FIG. 2 is a schematic diagram of a frame of display data.

FIG. 2 shows the sub-parts of an example frame [10] of display data such as may be produced by a conventional display system for display on a display panel. The frame [10] as a whole is comprised of a plurality of tile groups [12], the exact number depending on its size. In this example, there are 36 tile groups [12], each comprising a rectangular collection of 16 tiles [13]; this is a common size for a tile group [12], and it is common to arrange the tiles [13] in a tile group [12] in an 8×2 grid as shown in FIG. 1. It will be appreciated, however, that any number of tiles in any arrangement may be used, and, indeed, a tile group may be equivalent to a single tile.

A tile [13] is a geometrically-shaped collection of pixels [14]. A common arrangement for tiles [13] is an 8×8 grid of pixels [14] such as that shown in FIG. 1, but other arrangements according to particular systems may be used.

Each pixel [14] is made up of colour component values [15]. The most common initial colour space from which these values are taken is Red, Green, and Blue (RGB), though there are other colour spaces and during processing the colour space of the pixels [14] is often changed to a different colour space which can be transmitted more effectively. A collection of all the values [15] from all the pixels [14] in a tile [13] for a particular colour component [15] is known as a colour plane and is commonly conceptualised as a tile consisting of only the data for that particular colour component.

Figure 3:
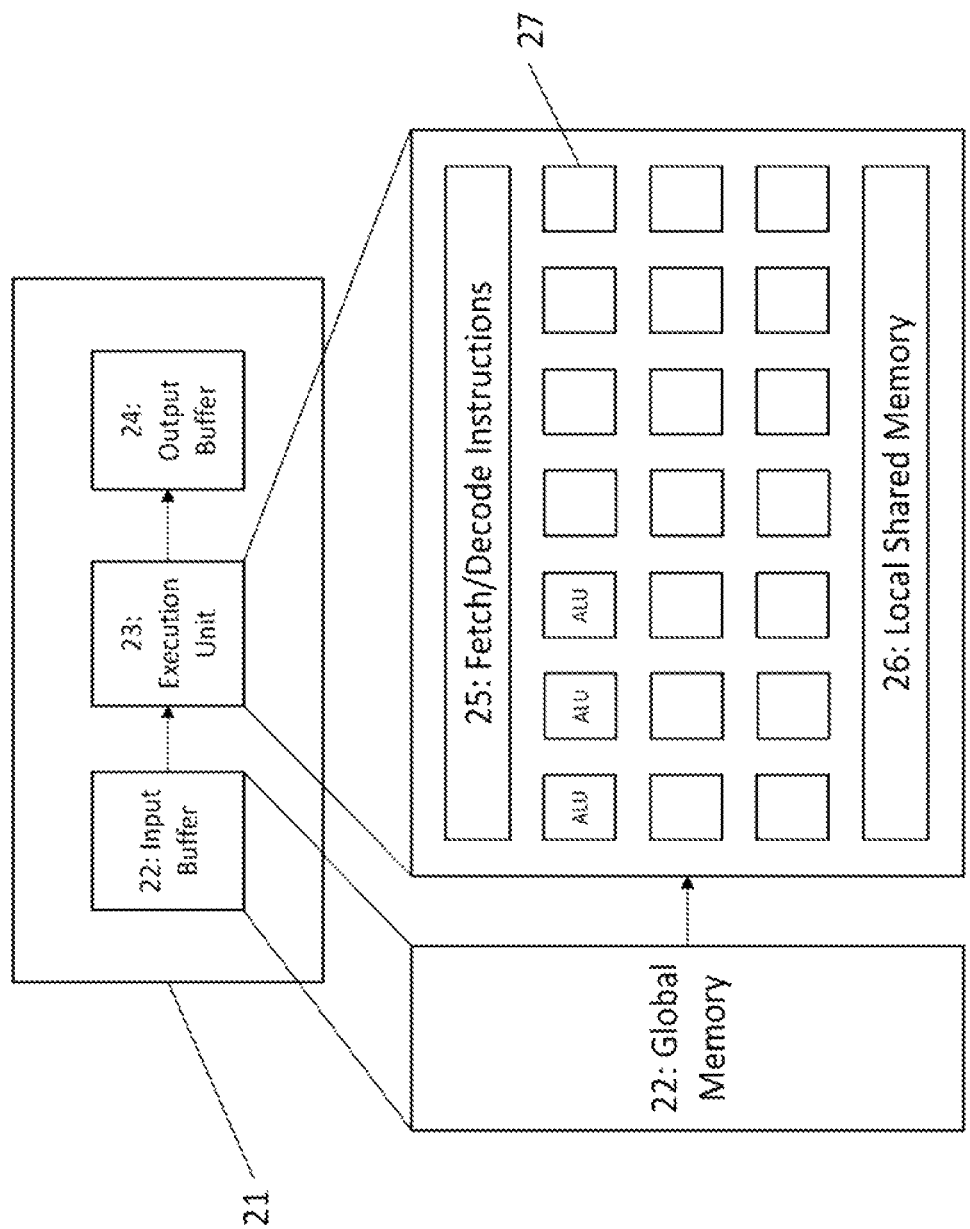
FIG. 3 is a schematic diagram of a basic part of a host computing device.

FIG. 3 shows a basic schematic of part of a host computing device [21]. Once a frame [10] such as that described in FIG. 1 has been generated by an application running on the host computing device [21], commonly in the Central Processing Unit (CPU), it is stored in an input buffer [22] which may also include instructions for the processing of the display data and therefore acts as a global memory [22]. The display data is then passed to an execution unit [23], which may be part of a Graphics Processing Unit (GPU), for processing. When processing is complete the display data is placed in an output buffer [24] for onward transmission on a bandwidth-limited output transport mechanism to another device for display.

This device is not shown in the Figures, but should include a mechanism for receiving and decoding the display data and outputting it to a display panel or multiple display panels for display. It may be a desktop docking station, control device connected to a television, mobile device, or wearable device such as a Virtual-Reality or Augmented-Reality headset.

The execution unit [23] comprises an engine [25] for fetching and decoding instructions for the processing of the display data, together with a local shared memory [26] and a number of Arithmetic Logic Units (ALUs) [27]. ALUs [27] act as sub-processors, each of which runs the instructions associated with a single processing thread.

A thread is a unit of computing which can operate independently of other threads with the exception of data dependencies: i.e. when one thread must wait for another thread's processing to complete before it can access data that it requires. Such dependencies can result in significant delay in overall processing and wasted resources; for example, if a thread running on a first ALU [27] (ALU1) is carrying out processing to produce an output required by two other ALUs [27] (ALU2 and ALU3), these ALUs [27] will be stalled until ALU1 has completed its operations. Since ALU1 would then store its output in the local shared memory [26], ALU2 and ALU3 must then access the memory [26] to read their respective inputs, introducing further delay. This is a problem the invention seeks to mitigate.

Each ALU [27] has a set of designated registers solely for the use of that ALU [27]. These can be used to store working data during the operation of each thread running on each ALU [27]. An embodiment of the invention provides a method of optimising processing of display data by using these registers. An example of such optimised processing is shown in FIG. 4.

As previously mentioned, a frame [10] is generated by an application running on the host computing device [21] and stored in the input buffer [22] (or global memory). Each tile group [12] is then fetched in sequence by the execution unit [23] for processing. Each tile [13] in the tile group [12] is processed separately from the other tiles [13] by, in this example, three threads each running on a separate ALU [27] as previously described. Alternatively, different tile groups may be processed by different execution units.

Figure 4A:
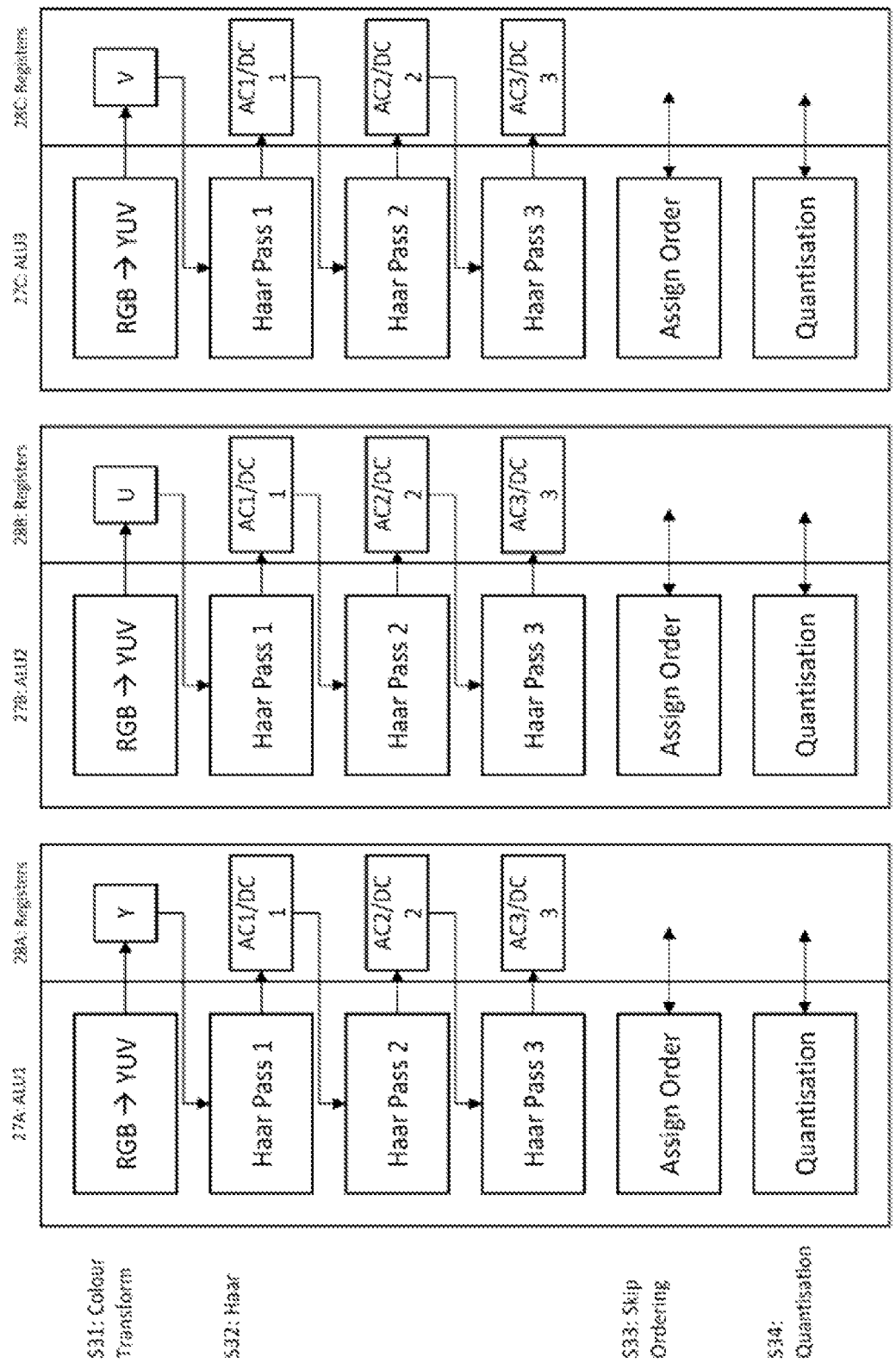

As shown in FIG. 4A, at Step S31, all three threads perform a reversible colour transform on the tile [13]. This means converting the colour component values [15] in the pixels [14] in the tile [13] from one colour space (in this example, RGB), to another colour space (in this example, luminance and chrominance, or YUV). Each ALU [27] then stores the resulting colour components in its dedicated registers [28].

Only one of the converted colour components will actually be used by each ALU [27], so at this stage the ALU [27] may only store or keep one of the converted colour components in its dedicated registers [28] and discard the other two. In FIG. 3A, this would mean that ALU1 [27A] stores or keeps the Y value, ALU2 [27B] stores or keeps the U value, and ALU3 [27C] stores or keeps the V value.

Alternatively, the ALU [27] may store all the converted colour values in its registry [28] and simply ignore two of them in later calculations.

While this means that there is some redundancy as all three threads perform the same processing on the RGB data [15], it eliminates dependencies between the three threads and means that no interaction with the local shared memory [26] is required.

This process is carried out for all the pixels [14] in the tile [13] and the resulting values are all stored in the registry [28] without any interaction with the local shared memory [26].

At Step S32, each thread running on its respective ALU [27] carries out a discrete wavelet transform on the data comprising its respective colour plane. In the case of ALU1 [27A], this means that the Y value generated and stored at Step S31 is fetched from ALU1's dedicated registers [28A] and, in this example, a Haar transform is carried out on the values. The resulting wavelet coefficients are then stored in the registry [28A]. The discrete wavelet transform process may end here, but it is common to carry out multiple passes of a Haar transform when encoding and compressing data, three being a common number of passes. Therefore, for the second pass of the Haar transform, the relevant values are fetched from the registry [28A] and transformed, then stored in the registry [28A] again, and likewise for the third pass. This results in DC and AC values for the Y colour component of the YUV colour space being stored in ALU1's dedicated registers [28A] and there is once again no interaction with the local memory [26].

The same process will be carried out by ALU2 [27B] and ALU3 [27C] for the U and V values respectively.

After the Haar transform, at Step S33, each ALU [27] carries out skip ordering, which re-orders the values stored in its respective registry [28] to prioritise the DC values and associate them with the correct AC coefficients. During and after skip ordering, the values can be represented as a stream of values with a particular order, which means that the ALU [27] simply assigns this order to the registers [28].

Similarly, at Step S34, each ALU [27] carries out quantisation, which means dividing the stored values by a constant and rounding them in order to reduce the volume of data and improve the effectiveness of compression. This is a simple arithmetic operation which can be executed on the registers [28] within the ALU [27]. From this point forward the different values are referred to as symbols. They are used as the input for entropy encoding.

The aim of entropy encoding is to assign optimal variable-length codes to different symbols according to their frequency in the stream, so a symbol that appears frequently in the stream will have a shorter code than a symbol that appears less frequently. This reduces the overall volume of the data in transmission. Entropy encoding can be carried out in parallel by different threads, but when the values are written out in sequence each thread must know the address to which it should write its output to place it in the correct location in the sequence. Since the codes are of variable length, the addresses depend on the total length of all the codes that have come before—known as the prefix sum—and this must be calculated on the fly. This can result in significant memory accesses as well as leading to thread dependency and the associated delays and inefficiencies.

FIG. 4B shows the process of entropy encoding, continuing with the example and process explained in FIG. 4A. Entropy encoding is the first part of the process in which access to the local memory [26] is required, and because of the use of the dedicated registers [28] such access is minimised. This minimisation reduces inter-thread dependency, thus reducing unnecessary delays and inefficiency, and maximises the efficiency of the memory access when it is required.

At Step S35, the symbols created by the part of the process outlined in FIG. 4A are mapped to codes as previously described. The codes are then stored in the dedicated registers [28] for each ALU [27].

At Step S36, each ALU [27] calculates the length of each code and stores this with the codes in its associated register [28]. These can then be used to calculate that colour plane's contribution to the prefix sums of other colour planes.

The methods by which these prefix sums are calculated at Step S37 vary by ALU [27].

ALU1 [27A] handles the Y values, which in this embodiment are put into the final sequence first and therefore have a prefix sum of 0. The thread running on ALU1 [27A] may therefore include instructions to store "0" in the registry as a constant. However, the total length of the codes assigned to the symbols derived from the Y values will contribute to the prefix sums of the other two colour planes, and accordingly the ALU [27A] adds up all the lengths of the codes in its registry and stores these values in the local memory as Prefix 1 [37A]. This requires only one write to the local memory [26].

ALU2 [27B] handles the U values, which in this embodiment are put in the second place in the sequence, preceded by the values from ALU1 [27A]. Accordingly, it fetches Prefix 1 [37A] from the local memory [26]. It does not need to add anything to Prefix 1's [37A] value because only ALU1's [27A] output will precede it in the final sequence and so simply stores it in the registry [28B] as its prefix sum.

ALU2 [27B] will also contribute to the prefix sum for ALU3 [27C], and accordingly, like ALU1 [27A], it adds up the total length of the codes assigned to the symbols derived from the U values and stores the result in the local memory as Prefix 2 [37B]. Again, this requires only one write to the local memory [26].

ALU3 [27C] handles the V values, which are put in the third and—in this example—final place in the sequence. It does not contribute to the prefix sums of subsequent ALUs [27] and therefore does not calculate the total length of its own codes, but it fetches Prefix 1 [37A] and Prefix 2 [37B] from memory [26], adds them together, and stores the total as its prefix sum.

Because Prefix 1 [37A] is fetched by all the ALUs [27] other than ALU1 [27A], this read process can be optimised by the execution unit [23] carrying out a single read that passes the same value to all the ALUs [27]. This is significantly more efficient than if all the ALUs [27] had to carry out separate reads in order to perform full calculations, as is the case with dependent data currently; each ALU [27] requires slightly different data which must therefore be fetched from different memory locations, making this optimisation impossible.

Naturally, in practice there might be many more ALUs [27] in operation processing subsequent tiles [13] in the tile group [12], and they would require their own prefix sums derived from totals produced by ALU1 [27A], ALU2 [27B], ALU3 [27C], and so on, since in this system ALU(n) always calculates its prefix sum based on the totals produced by ALU1-ALU(n−1). In this case, ALU3 [27C] would create and store its own total in the same way as ALU2 [27B] is described as doing. The system scales well due to the optimisations possible when many threads all fetch the same data from the same addresses in local memory [26].

Figure 4C:
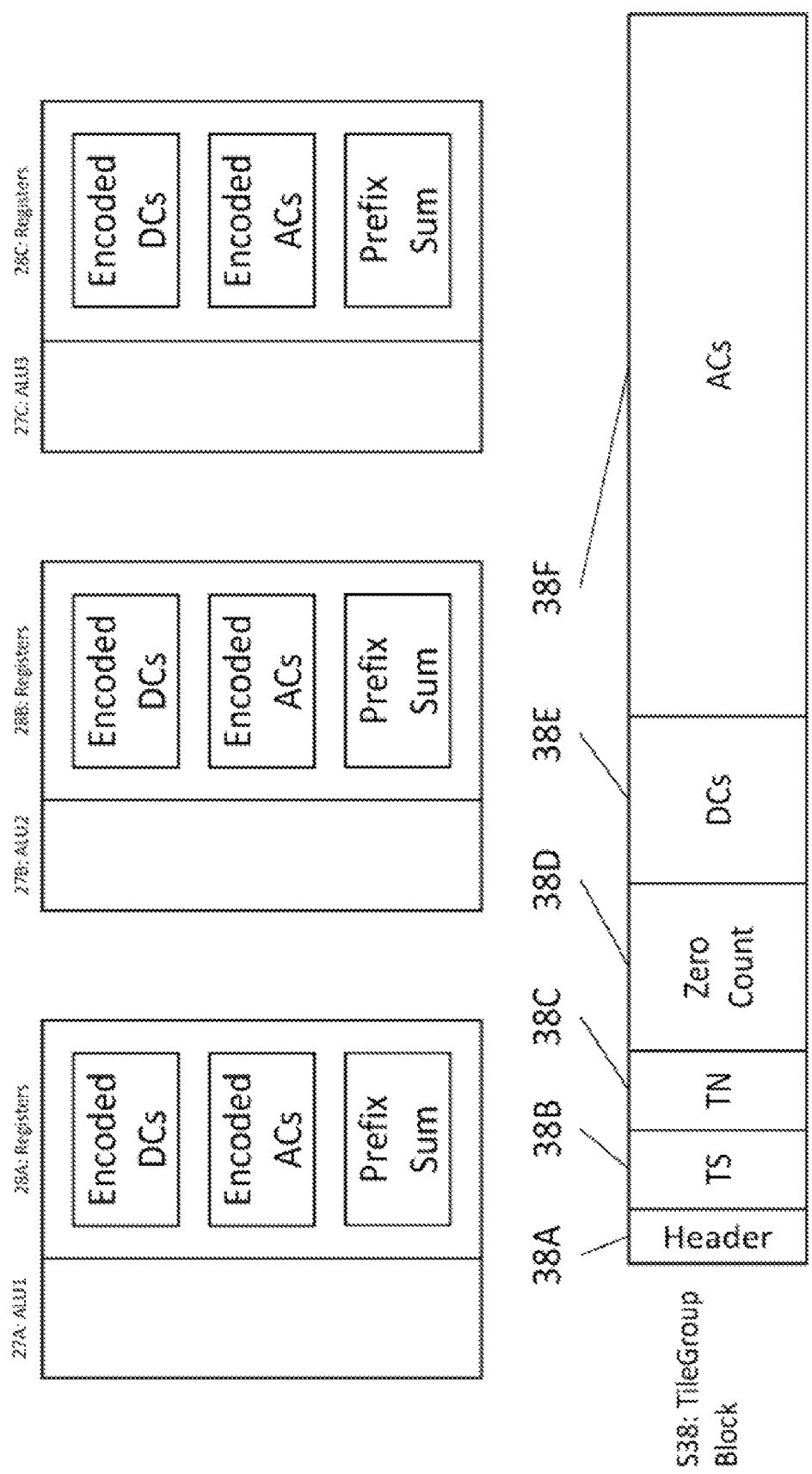

FIG. 4C shows the final stage, step S38, in which the encoded data is placed in a TileGroup Block for transmission. The TileGroup Block comprises a header [38A], a Table Select value [38B] indicating settings that should be used by the corresponding decoder for decoding the data, a Tile Normalisation value [38C] which acts as a scaling factor applied to all quantisation values except that associated with the final DC values, a Zero Count [38D] which contains the number of zero values produced by the encoding, in order to avoid wasting space by sending a large volume of null data, and finally the encoded data itself.

The three ALUs [27A, 27B, 27C] contain their relevant encoded DCs, ACs, and prefix sums, generated as previously described and stored in their dedicated registers [28A, 28B, 28C]. First the encoded DCs [38E] are copied from their respective registers [28] into places in the TileGroup Block according to their respective prefix sums, and then the same is done with the AC values [38F] in their skip order as previously assigned.

This method means that display data can be processed with the bare minimum of interaction between the ALUs [27] carrying out the processing and the execution unit's [23] local shared memory [26] and between threads, reducing thread dependency and the use of slow memory access processes.

Although only one particular embodiment has been described in detail above, it will be appreciated that various changes, modifications and improvements can be made by a person skilled in the art without departing from the scope of the present invention as defined in the claims.

For example, in one embodiment, the encoded display data may be received over a Universal Serial Bus (USB) connection by a USB 2.0 or 3.0 or SS USB device, where preferably, the output of the device is being protected against copy protection using AES, negotiated using HDPC.

Preferably, the AC coefficients are ordered so that trailing coefficients represent highest-frequency data, and trailing zero coefficients may be omitted. The reason for this is that in many typical computer display images there are large areas where adjacent pixels are identical, or have very similar values. The highest frequency information in the Haar transform consists of the difference in value between adjacent pixels, and in practice the values are often zero. By ordering the values to leave these at the end, and omitting trailing zero values, compression is typically improved.

The host device may be structured so that a low compute load is placed on the host system to encode and transmit the video data with very low latency caused by the sequence of encoding, transmitting over USB, decoding and displaying so that a human user finds the USB-connected display to be an acceptable replacement for a display connected via a dedicated video signal cable. The image encoded format is suitable both for photographic data and for computer desktop displays.

In one example, the video decoding device (embodied as a silicon chip or an end user product) receives an encoded video signal, decodes the video signal, and outputs the decoded signal to a video display device over a video link (such as HDMI, DVI, DP). The encoded signal format may be divided into groups of 8×2 tiles so that partial updates of video frame may be performed. Each tile group separately identifies its intended location in the displayed image so that local changes to not require a complete frame update. Each tile group contains fewer than twenty 8×2 tiles and the decoded signal is sent to a video raster display port (such as HDMI, DVI, DisplayPort), or is displayed directly on a visual display which forms part of the device.

What is claimed is:

1. A method comprising:
receiving, by a first arithmetic logic unit (ALU) of a plurality of ALUs, a tile of image data including a plurality of first colour component values associated with a plurality of first colour component planes representing a first colour space;
reversibly transforming the plurality of first colour component values into a plurality of second colour component values associated with a plurality of second colour component planes representing a second colour space;
performing a discrete wavelet transformation that transforms one or more colour component values of the plurality of second colour component values into a plurality of first wavelet coefficients based on a respective colour component plane, of the plurality of second colour component planes, associated with the first ALU, the one or more colour component values being associated with the respective colour component plane;

storing the plurality of first wavelet coefficients in a dedicated register space for use solely by the first ALU;

quantizing the plurality of first wavelet coefficients; and storing the plurality of quantized first wavelet coefficients in the dedicated register space.

2. The method of claim 1, wherein the first colour space is a red, green, and blue (RGB) colour space.

3. The method of claim 1, wherein the second colour space is a luminance-chrominance colour space.

4. The method of claim 3, wherein the second colour space is a YUV colour space.

5. The method of claim 1, wherein the discrete wavelet transformation is based on a Haar transform.

6. The method of claim 5, wherein performing the discrete wavelet transformation includes applying the Haar transform a plurality of times to produce the plurality of first wavelet coefficients.

7. The method of claim 1, wherein the plurality of quantized first wavelet coefficients are entropy encoded into a plurality of codes using the first ALU.

8. The method of claim 1, further comprising:
storing the plurality of second colour component values in the dedicated register space.

9. The method of claim 8, wherein the discrete wavelet transformation is performed on the one or more colour component values associated with the one of the plurality of second colour component planes while discarding the remaining colour component values stored in the dedicated register space.

10. The method of claim 1, further comprising:
entropy encoding the plurality of quantized first wavelet coefficients into a plurality of codes.

11. The method of claim 1, further comprising:
receiving, by a second ALU of the plurality of ALUs, the tile of image data including the plurality of first colour component values associated with the plurality of first colour component planes representing the first colour space;
reversibly transforming the plurality of first colour component values received by the second ALU into a plurality of third colour component values associated with a plurality of third colour component planes representing the second colour space;
performing a discrete wavelet transformation that produces a plurality of second wavelet coefficients based on one or more colour component values of the plurality of third colour component values, the one or more colour component values of the plurality of third colour component values being associated with one of the plurality of third colour component planes;
storing the plurality of second wavelet coefficients in a dedicated register space for use solely by the second ALU;
quantizing the plurality of second wavelet coefficients; and
storing the plurality of quantized second wavelet coefficients in the dedicated register space for use solely by the second ALU.

12. The method of claim 11, wherein the plurality of second wavelet coefficients are not stored in a local memory shared by the plurality of ALUs.

13. A device comprising:
a memory; and
an arithmetic logic unit (ALU) configured to:
receive a tile of image data including a plurality of first colour component values associated with a plurality of first colour component planes representing a first colour space;
reversibly transform the plurality of first colour component values into a plurality of second colour component values associated with a plurality of second colour component planes representing a second colour space;
perform a discrete wavelet transformation that transforms one or more colour component values of the plurality of second colour component values into a plurality of first wavelet coefficients based on a respective colour component plane, of the plurality of second colour component planes, associated with the ALU, the one or more colour component values being associated with the respective colour component plane;
store the plurality of wavelet coefficients in a dedicated register space in the memory for use solely by the ALU;
quantize the plurality of wavelet coefficients; and
store the plurality of quantized wavelet coefficients in the dedicated register space.

14. The device of claim 13, wherein the first colour space is a red, green, and blue (RGB) colour space.

15. The device of claim 13, wherein the second colour space is a luminance-chrominance colour space.

16. The device of claim 13, wherein the discrete wavelet transformation is based on a Haar transform.

17. The device of claim 16, wherein performing the discrete wavelet transformation includes applying the Haar transform a plurality of times to produce the plurality of wavelet coefficients.

18. The device of claim 13, wherein the device is further configured to store the plurality of second colour component values in the dedicated register space.

19. A system comprising:
a memory; and
a plurality of arithmetic logic units (ALUs), wherein each of the plurality of ALUs is configured to:
receive a tile of image data including a plurality of first colour component values associated with a plurality of first colour component planes representing a first colour space;
reversibly transform the plurality of first colour component values into a plurality of second colour component values associated with a plurality of second colour component planes representing a second colour space;
perform a discrete wavelet transformation that transforms one or more colour component values of the plurality of second colour component values into a plurality of wavelet coefficients based on a respective colour component plane, of the plurality of second colour component planes, associated with the ALU, the one or more colour component values being associated with the respective colour component plane;
store the plurality of wavelet coefficients in a dedicated register space in the memory for use solely by a respective ALU of the plurality of ALUs;
quantize the plurality of wavelet coefficients; and
store the plurality of quantized wavelet coefficients in the dedicated register space.

20. The system of claim 19, wherein the plurality of wavelet coefficients are not stored in a local memory shared by the plurality of ALUs.

\* \* \* \* \*